United States Patent [19]
Martin et al.

[11] 3,815,135
[45] June 4, 1974

[54] DIRECTION FINDING INTERFEROMETER FOR A LINEAR FM SIGNAL

[75] Inventors: Paul E. Martin; William M. Sherrill; Terence C. Green, all of San Antonio, Tex.

[73] Assignee: The United States of America as represented by the Secretary of the Air Force, Washington, D.C.

[22] Filed: Oct. 26, 1972

[21] Appl. No.: 300,934

[52] U.S. Cl. .............................. 343/113 R, 343/120
[51] Int. Cl. .............................................. G01s 5/02
[58] Field of Search ............. 343/113 R, 113 D, 120

[56] References Cited
UNITED STATES PATENTS
3,383,690  5/1968  Keller ............................ 343/113 R
3,680,124  7/1972  Stone et al. ..................... 343/113 R

*Primary Examiner*—Malcolm F. Hubler
*Assistant Examiner*—S. C. Buczinski
*Attorney, Agent, or Firm*—Harry A. Herbert, Jr.; William Stepanishen

[57] ABSTRACT

A direction finding interferometer apparatus for performing interferometric direction finding measurements against a linear FM/CW signal. A minimum number of antenna elements are utilized to provide interferometer phase measurements.

3 Claims, 2 Drawing Figures

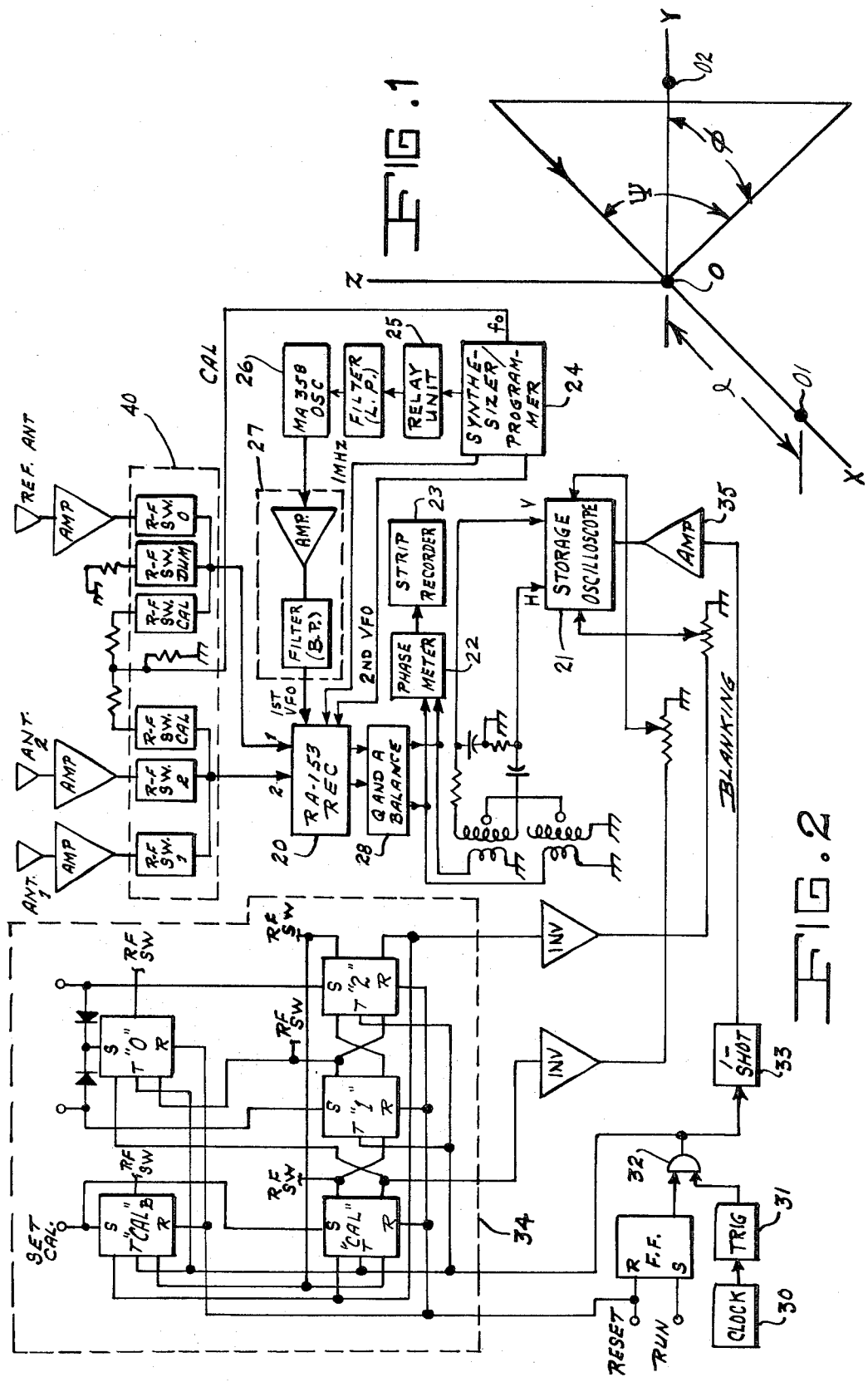

DIRECTION FINDING INTERFEROMETER FOR A LINEAR FM SIGNAL

BACKGROUND OF THE INVENTION

The present invention relates broadly to interferometric direction finding systems and in particular to a direction finding interferometer apparatus for analyzing a linear FM (FM/CW) signal.

Interferometric direction finding measurements using three and five-element interferometer configurations are commonly performed against fixed frequency signals. The interferometer antenna elements are switched sequentially in pairs through a twin channel receiver. The instantaneous relative phase for each antenna pair is therefore measured sequentially and recorded for on-line or off-line directional computations.

With the increasing use of FM/CW transmitters and receivers in the HF range, it is of interest to perform direction finding on the low power FM/CW signal. Specifically, the present invention utilizes the interferometer antennas and receiving equipment with refinement and modifications to perform the FM/CW direction finding function.

SUMMARY

The present invention performs interferometric direction finding measurements against a linear FM/CW signal utilizing a three-element two-baseline interferometer. The interferometer phase measurements are derived from the three-element two-baseline interferometer operating in conjunction with a twin channel receiver which is adapted to accept linear FM synthesis. An analog sum and difference phasemeter and an electronic phasemeter are utilized to record the interferometer phase measurements. An off-line data reduction facility provides the computed directions.

It is one object of the invention, therefore, to provide an improved direction finding interferometer apparatus utilizing an HF twin channel receiver for linear FM synthesis.

It is another object of the invention to provide an improved directing finding interferometer apparatus to apply the direction finding technique to FM/CW ionospheric sounding.

It is still another object of the invention to provide an improved direction finding interferometer apparatus to perform interferometric direction finding measurements against a linear FM/CW signal.

It is yet another object of the invention to provide an improved direction finding interferometer apparatus utilizing a three element two baseline interferometer to obtain phase measurements.

These and other advantages, features and objects of the invention will become more apparent from the following description taken in connection with the illustrative embodiment in the accompanying drawings.

BRIEF DESCRIPTION OF THE DRAWINGS

FIG. 1 is a three coordinate graph illustrating the geometry of orthogonal baselines of equal length, and, FIG. 2 is a block diagram of a linear FM/DF interferometer apparatus in accordance with the present invention.

DESCRIPTION OF THE PREFERRED EMBODIMENT

The theory which applies to linear FM direction finding will become apparent from the following detailed description. The phase measuring interferometer provides the basis for the capability of direction finding in azimuth $\theta$, and elevation $\Psi$, and to provide resolution of individual propagation modes. The antenna array which provides this capability is achieved with a minimum number of antennas though it requires the simultaneous solution of at least two trigonometric phase-response equations from phase measurements on independent baselines. The geometry for the special case of orthogonal interferometer unambiguous phase $\zeta_{01}$ between elements 01 and 0 for a single received plane wave is given by $$\zeta_{01} = \beta l \sin \phi \cos \Psi \text{ rad} \quad (1)$$

where $$\beta = 2\pi/\lambda = \omega/c = 2\pi f/c$$

However, the baselines need not be either orthogonal or of equal length.

With respect to a linear FM signal, the same phase difference expressed in terms of the instantaneous value of a changing frequency is given by $$\zeta_{01} = (2\pi l/c)(f_i) \sin \phi \cos \Psi \text{ rad}$$

For the linear FM signal, the instantaneous frequency $f_i$ will be defined as $$f_i = [f_o + (t - t_o)(df/dt)] = (f_o + R_\tau) \text{ Hz}$$

where the zero subscripts denote starting frequency and time and $$R = (df/dt) \text{ Hz per sec } \tau = (t - t_o) \text{ sec}$$

Hence, $$\zeta_{01} = (2\pi l/c)(f_o + R_\tau) \sin \phi \cos \Psi \text{ rad} \quad (2)$$

The corresponding total unambiguous phase difference for the orthogonal baseline 02 is $$\zeta_{02} = 2\pi l/c (f_o + R_\tau) \cos \phi \cos \Psi \quad (3)$$

The equations (2) and (3) must be solved simultaneously for the incident azimuth and elevation angles in terms of unambiguous measured phase angles $\zeta_{01}$ and $\zeta_{02}$.

The initial frequency ($f_o$), baseline length ($l$) and rate of change of frequency ($R$) are defined by the design of the system and must be used for the simultaneous solution to the required bearing equations for $\phi$ and $\Psi$. The bearing equations are derived from Equations (2) and (3), where the ratio provides the azimuth and the sum of the squares provides the elevation. Hence.

$$\tan \phi = \zeta_{01}/\zeta_{02}$$

and $$\cos \psi = \sqrt{\frac{\zeta_{01}^2 + \zeta_{02}^2}{\frac{2\pi l}{c}(f_o + R\tau)}}$$

Since the phase measurements must be performed over finite time periods, the rate of change of received phase with time produced by the frequency sweep must be known to establish an acceptable limit on the sampling time duration which can be tolerated for a frame of data.

For the linear FM single-plane wave signal, the rate of phase change for a constant direction in the 01 baseline is $$d\zeta_{01}/dt = (2\pi l/c)(d/dt)[f_o + (df/dt)(t=t_o)]\sin\phi\cos\Psi$$
$$= (2\pi l/c)[(df/dt) + (t - t_o)(d^2f/dt^2)]\sin\phi\cos\Psi$$

Since only constant sweep rates are considered, $$d^2f/dt^2 = 0$$

the technique may be generalized to variable sweep rates where $$d^2f/dt^2 \ne 0$$

The phase rates of change for the two baselines are given by $$d\zeta_{01}/dt = (2\pi l \sin\phi \cos\Psi/c) \cdot (df/dt)$$
$$d\zeta_{02}/dt = (2\pi l \cos\phi \cos\Psi/c) \cdot (df/dt)$$

For a given short sampling time interval, $\Delta t$, during which the frequency changes by $\Delta f$, the corresponding phase changes are given by $$\Delta\zeta_{01} = (2\pi l \Delta f/c)\sin\phi\cos\Psi$$
$$\Delta\zeta_{02} = 2\pi l \Delta f/c \cos\phi\cos\Psi$$

(4)

Equations (4) are evaluated in Table 1 to determine the rate of change of phase with time for given frequency sweep rates, R, and 150-m baselines. For 100- and 25-kHz sweep rates, 18°- and 4.5°- phase change per second, respectively, are provided for $\sin\phi = \cos\Psi = 1$. These phase changes can be tolerated without significant degradation of azimuth and elevation angle resolution or accuracy for the frequencies and array apertures considered.

TABLE 1

| Frequency Sweep Rate (R) | Frequency Change ($\Delta f$) | Phase Change ($\Delta B$) |
|---|---|---|
| 1 MHz/sec | 1 MHz | 180° |
| 100 kHz/sec | 0.1 MHz | 18° |
| 25 kHz/sec | 0.025 MHz | 4.5° |

For example, if the analog phasemeter response time is 10 msec, corresponding phase measurement errors are less than 1°. The sum-and-difference phasemeter with CRT display may also be used for linear FM/DF experiments. The plane wave CRT phase display is a straight line with slope proportional to half the phase differnece. If a second "incoherent" propagation mode is present, both modes are resolved in azimuth and elevation over the coherence time of the two modes. The storage CRT display for this case is a parallelogram envelope with the slope of the sides proportional to directional phase difference and the length of the sides proportional to mode amplitude. When the signal-to-noise ratio is great enough to allow direct phase measurement techniques, FM/DF experiments can be performed without narrow band filtering as provided by a spectrum analyzer.

Turning now to FIG. 2, there is shown a linear FM/DF interferometer apparatus utilizing a twin-channel receiver 20 and linear FM sounder equipment. A storage oscilloscope 21, phasemeter 22, and strip-chart recorder 23 are used to record and display phase and amplitude information. A solid state sequencer 40 is required to sequence the antenna outputs of a three-element orthogonal interferometer array to the twin-channel receiver. The interferometer array consisted of three, crossed, simple-loop elements arranged in an orthogonal L-shaped array. The solid state sequencer 40 switches the antennas by pairs into the phase and gain matched twin channel receiver 20, synthesized coherently with the linear FM transmitter. Each sequence is completed by injecting into the two channels equal amplitude, in-phase calibrate signals. A balanced RF switch is used in both channels to provide equal amplitude and phase response independent of the antenna or calibration mode selected.

Receiver frequency is controlled by the synthesizer programmer 24, operating in the swept-frequency mode. A relay unit 25 which is controlled by the synthesizer programmer 24 triggers the receiver oscillator 26 to produce discrete MHz VFO injection through a buffer amplifier and filter 27. The synthesizer programmer 24 simultaneously produces a linear ramp, second VFO injection, which sweeps the receiver 20 over each 1-MHz interval. A fixed 1-MHz signal is fed from the synthesizer 24 to the receiver 20 for final conversion to the IF frequency. The instantaneous RF carrier frequency is also obtained from the synthesizer 24 and sequenced into the receiver as a calibration signal.

The IF outputs are routed through IF amplifiers 28 to the storage oscilloscope 21 which is operating as a sum-and-difference CRT phasemeter. The amplifiers 28 have independent phase and amplitude balance controls for calibration. The slope of the major axis indicates one-half the relative phase angle between the two RF inputs and the ellipse axial ratio indicates the amplitude difference between the two channels. For example, a vertical, straight-line display indicates 0°- relative phase and equal amplitude signals in both channels, while a circular display indicates a high signal amplitude difference in the two channels and an undefined phase angle.

Three separate sum-and-difference displays are provided on the storage oscilloscope 21 in the following sequence: (1) Cal, (2) Baseline 1, and (3) Baseline 2. Sum-and-difference displays are positioned on the storage oscilloscope 21 from the sequencer 24 by inserting a fixed DC offset voltage into the sum-and-difference circuits. The sequencer rate is controlled by a clock 30 which is variable from three to 350 pulses per second. This corresponds to a Cal/DF rate (three cycles per frame) of one to 117 frames per second. The output of the clock 30 and trigger circuit 31 is switched through an AND gate 32 which is activated by the RUN control function. In the RUN mode, the clock pulse is fed to a one-shot multivibrator 33 which provides a display transition blanking pulse to five SET/RESET circuit modules 34 which sequence through the three required states and through amplifier 35 to oscilloscope 21. The SET/RESET-circuit 35 outputs sequence the RF inputs to the Racal receiver 20 and the sum-and-difference display positions. Each baseline and the Cal state may be manually selected from the front panel. The differential phasemeter 22 is used across the IF outputs to provide a strip-chart record of the measured phase angles.

Although the invention has been described with reference to a particular embodiment, it will be understood to those skilled in the art that the invention is capable of a variety of alternative embodiments within the spirit and scope of the appended claims.

I claim:

1. A direction finding interferometer apparatus for a linear FM signal comprising in combination:
   an antenna array to receive a linear FM/CW signal, and antenna array being arranged in a crossed baseline interferometer array, said antenna array providing output signals,
   a sequencer unit connected to said antenna array, said sequencer controlling the passage of said output signals, said sequencer deriving an output signal pair from said output signals,
   a receiver connected to said sequencer, said receiver having first and second input channels, said receiver receiving said output signal pair at said first and second input channels, said first and second input channels having a balanced RF switch, said balanced RF switch providing equal amplitude and phase response.
   a synthesizer programmer unit to control said receiver, said synthesizer programmer unit providing VFO injection and a linear ramp to said receiver, said synthesizer programmer providing an instantaneous RF carrier frequency to said sequencer to be sequenced into said receiver as a calibration signal, said receiver providing IF output signals,
   an IF amplifier unit to receive said IF output signals, said IF amplifier unit amplifying said IF output signals and providing amplified IF output signals, and
   a monitor oscilloscope connected to said IF amplifier unit to receive said amplified IF output signals, said oscilloscope displaying said amplified IF output signals.

2. A direction finding interferometer apparatus as described in claim 1 further including
   a set-reset circuit comprising a clock and trigger circuit to provide a pulse rate, said pulse rate being variable from three to 350 pulses per second, said clock and trigger circuit controlling said sequencer rate, and
   five set-reset circuit modules which sequence the oscilloscope to provide sum and difference displays.

3. A direction finding interferometer apparatus as described in claim 1 wherein said interferometer array comprises three, crossed, simple-loop antenna elements arranged in an orthogonal L-shaped array.

* * * * *